US011653586B2

(12) United States Patent
Wemyss

(10) Patent No.: US 11,653,586 B2
(45) Date of Patent: May 23, 2023

(54) AGRICULTURAL GROUND OPENER DEPTH ADJUSTMENT MECHANISM

(71) Applicant: BPR Engineering Pty Ltd, Corowa (AU)

(72) Inventor: Colin Wemyss, Corowa (AU)

(73) Assignee: BPR Engineering Pty Ltd, Corowa (AU)

( * ) Notice: Subject to any disclaimer, the term of this patent is extended or adjusted under 35 U.S.C. 154(b) by 337 days.

(21) Appl. No.: 17/010,223

(22) Filed: Sep. 2, 2020

(65) Prior Publication Data

US 2022/0061203 A1 Mar. 3, 2022

(51) Int. Cl.

| | |
|---|---|
| ***A01B 63/16*** | (2006.01) |
| ***A01B 63/00*** | (2006.01) |
| ***A01C 5/06*** | (2006.01) |

(52) U.S. Cl.

CPC .......... *A01B 63/166* (2013.01); *A01B 63/002* (2013.01); *A01C 5/064* (2013.01)

(58) Field of Classification Search

CPC ...... A01B 63/002; A01B 63/166; A01C 5/064
See application file for complete search history.

(56) References Cited

U.S. PATENT DOCUMENTS

| | | | | |
|---|---|---|---|---|
| 7,168,376 B2 | 1/2007 | Johnston | | |
| 2011/0113997 A1* | 5/2011 | Schilling et al. | ...... | A01C 7/203 111/163 |
| 2014/0216312 A1* | 8/2014 | Bassett | .................. | A01B 15/18 111/121 |
| 2016/0066498 A1* | 3/2016 | Bassett | .................. | A01C 5/064 172/184 |

* cited by examiner

*Primary Examiner* — Tara Mayo
(74) *Attorney, Agent, or Firm* — Morgan, Lewis & Bockius LLP

(57) ABSTRACT

Ground opener units for agricultural seeding machinery and the like utilise a gauge wheel and associated depth adjustment mechanism for regulating the penetration depth of the disk opener in use. An improved gauge wheel adjustment assembly comprises a spindle adapted to be rotatably supported in a spindle sleeve, the spindle having a shaft with a first end with a rectangular boss adapted for engagement with a depth adjustment handle of the disk opener and a second end with a tapered spline engagement formation. A gauge wheel support arm has a complementary tapered spline formation for engagement with the spindle second end.

7 Claims, 16 Drawing Sheets

*Figure 8*
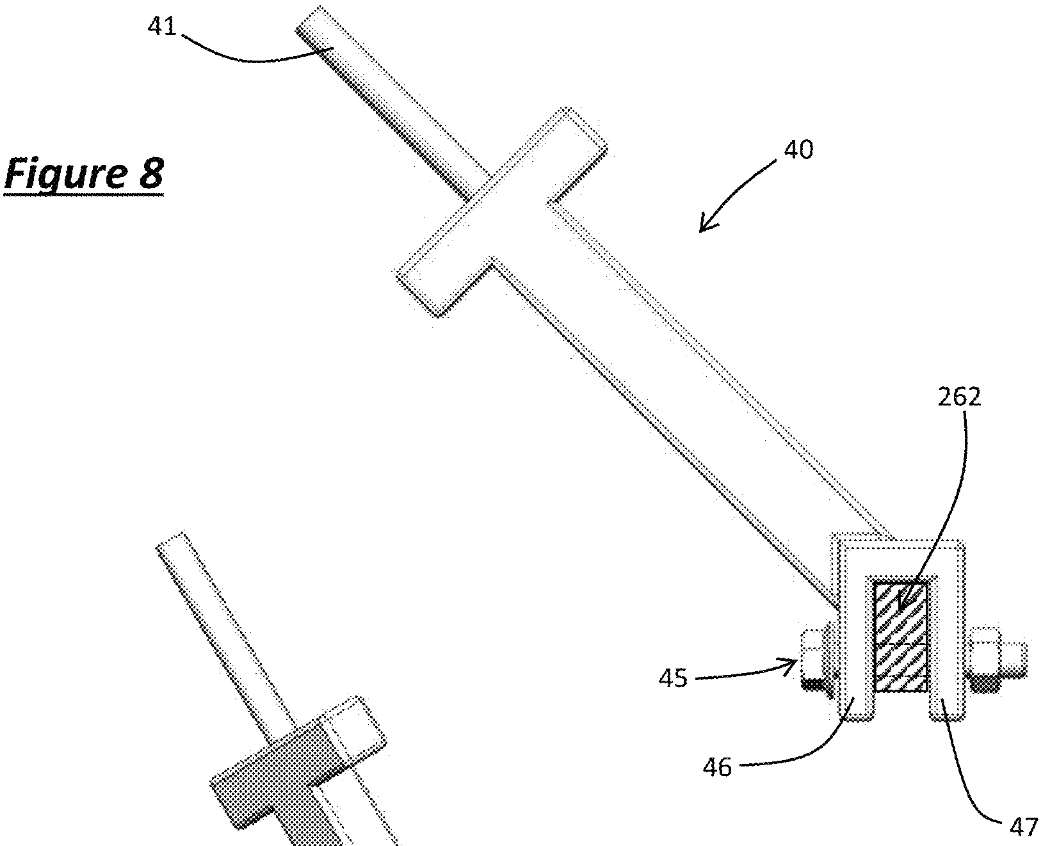
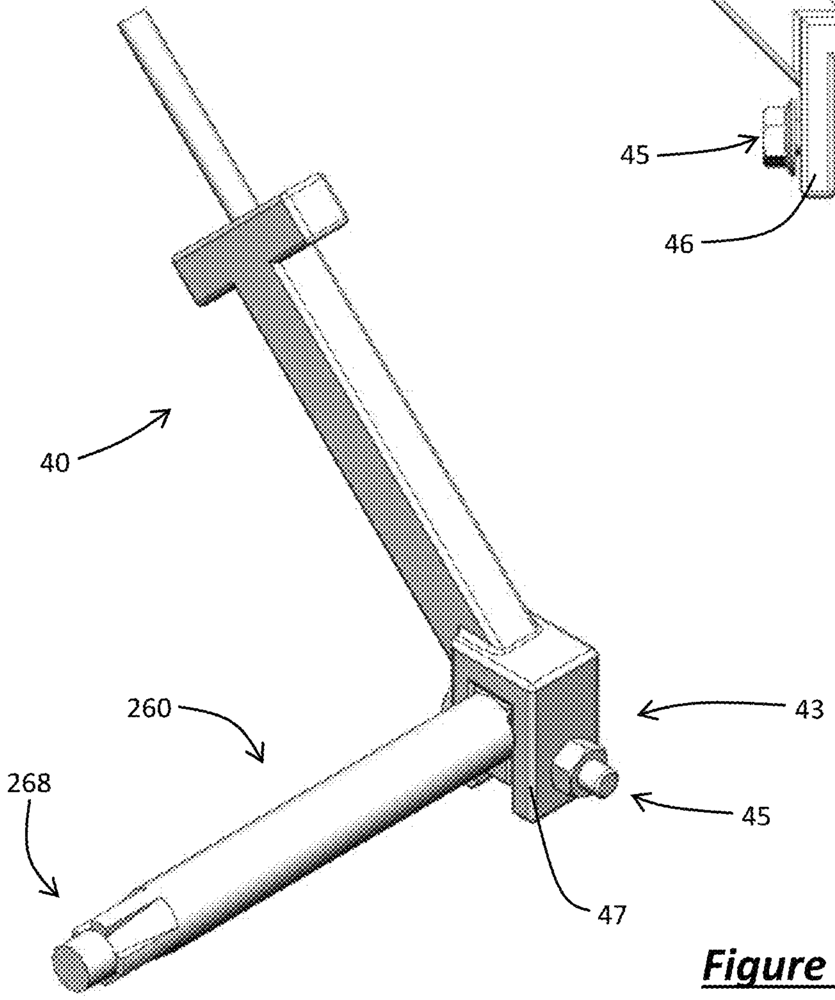
*Figure 7*

AGRICULTURAL GROUND OPENER DEPTH ADJUSTMENT MECHANISM

FIELD

The present invention relates generally to ground opener units for agricultural seeding machinery and the like. In particular, the invention relates to an improved depth adjustment mechanism for regulating the penetration depth of a disk opener in use.

BACKGROUND

Planting equipment for large-scale agriculture may typically include a row of 'disk openers' arranged across frame which is towed by a tractor. In use, each disk cuts a furrow or trench in the soil into which seed and/or fertiliser is deposited. The seed and/or fertiliser is dropped through a tube into the trench which the disk holds open, and then the trench walls collapse and a trailing wheel packs the soil on top of the seed/fertiliser.

The depth at which the disk cuts the furrow into the soil is controlled by a gauge wheel that runs in relative close proximity to the disk. The gauge wheel is mounted in relation to the axis of the opener disk so that the vertical distance between the gauge wheel contact with the ground and the bottom of the disk can be adjusted, thereby controlling the depth of the furrow. The mounting arrangement of the gauge wheel and the mechanism that enables the user to adjust the selected depth can be subjected to significant vibrations and exposure to dust during operation of the equipment, leading to various modes of failure. For instance, growers who plant large areas per year with John Deere drills or air-seeders frequently find that their depth can no longer be adjusted after as little as two years in the field.

There is a need, therefore, for improved mechanisms for adjusting the gauge wheel on disk openers to control the penetration depth of the disk in use.

SUMMARY

In accordance with the present invention there is provided a gauge wheel adjustment assembly for controlling penetration depth of a disk opener, comprising: a spindle adapted to be rotatably supported in a spindle sleeve, the spindle having a shaft with a first end with a rectangular boss adapted for engagement with a depth adjustment handle of the disk opener and a second end with a tapered spline engagement formation; a gauge wheel support arm having a complementary tapered spline formation for engagement with the spindle second end.

In embodiments the rectangular boss has outside dimensions larger than the interior diameter of the spindle sleeve. Preferably the rectangular boss is adapted to be received between two legs of a bifurcated structure on the depth adjustment handle. The rectangular boss preferably includes a through hole that in use aligns with holes in the bifurcated legs to receive a lock bolt.

In embodiments the tapered spline formation of the spindle second end comprises a plurality of teeth distributed around the circumference of the spindle shaft with frustoconical tapered surfaces therebetween. Accordingly, the tapered spline formation of the support arm comprises an aperture with a plurality of slots distributed around the circumference thereof with frustoconical tapered surfaces therebetween. The teeth on the spindle are adapted to be received in the slots of the support arm.

Preferably the spindle sleeve has first and second ends each provided with internal single lip and external triple-lip seals for sealing against respective external surfaces of the spindle shaft and support arm.

BRIEF DESCRIPTION OF THE DRAWINGS

Further disclosure, objects, advantages and aspects of the present invention may be better understood by those skilled in the relevant art by reference to the following description of preferred embodiments taken in conjunction with the accompanying drawings, which are given by way of illustration only and thus not limitative of the present invention, and in which:

FIG. 7 is a perspective view of the these components when assembled;

FIG. 8 is a front view of the angle adjustment handle illustrating engagement with the spindle according to an embodiment of the present invention;

DETAILED DESCRIPTION

The depth arm pivot assembly sets the seed planting depth and is a critical aspect of any no-till drill. Multiple adjustments can be required during the planting season to ensure seed is placed at the right depth for moisture and ideal germination of a particular seed type or variety. Time and wear can cause the depth adjuster shaft to become stiff or seized resulting in the inability to make these key seed depth adjustments. Embodiments of the present invention provide and improved gauge wheel depth adjustment assembly.

Figure 1:
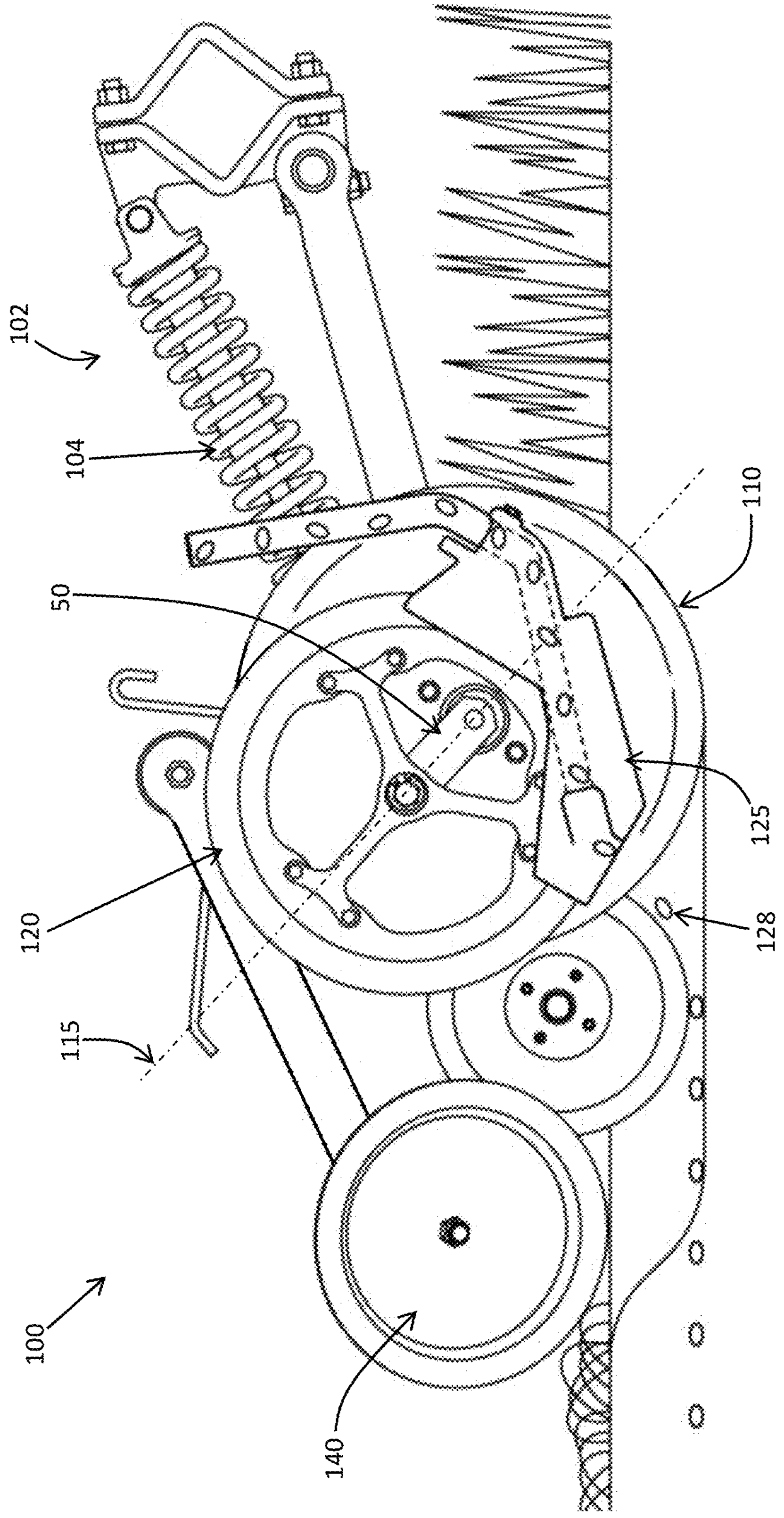
FIG. 1 is a diagrammatic side view of a disk opener unit.

FIG. 1 is a diagrammatic side view of a disk opener unit 100. The disk opener unit is in use coupled, by way of trailing arm 102, to a tool bar or the like to be towed behind a tractor. A plurality of such opener units in practice are arranged in parallel.

The trailing arm of the disk opener unit 100 includes a spring 104 that applies downward pressure on the opener disk 110. The purpose of the disk 110 is to form a furrow in the soil, and the depth to which the opener disk penetrates the ground is controlled by a gauge wheel 120 that is positioned in relatively close proximity to the opener disk 110. The disk opener unit 100 also carries a seed tube or boot 125 that is coupled to a feeding source of seed and/or fertilizer 128, wherein the seed and/or fertilizer is directed into the furrow. A trailing wheel 140 packs the furrow after the seed and/or fertilizer has been deposited.

The gauge wheel 120 in use rolls on the surface of the ground, while the opener disk 110 penetrates the soil. Accordingly, the relative vertical positioning of the gauge wheel to the opener disk allows control of the penetration depth of the opener disk. The gauge wheel 120 is mounted on a depth adjustment arm 50, one end of which supports the gauge wheel axle and the other end of which is mounted to a spindle that extends through the centre of the opener disk. The gauge wheel 120 may be raised or lowered, relative to the opener disk 110, by rotation of the depth adjustment arm 50 on the spindle, changing the angle of the arm axis indicated at 115.

Figure 2:
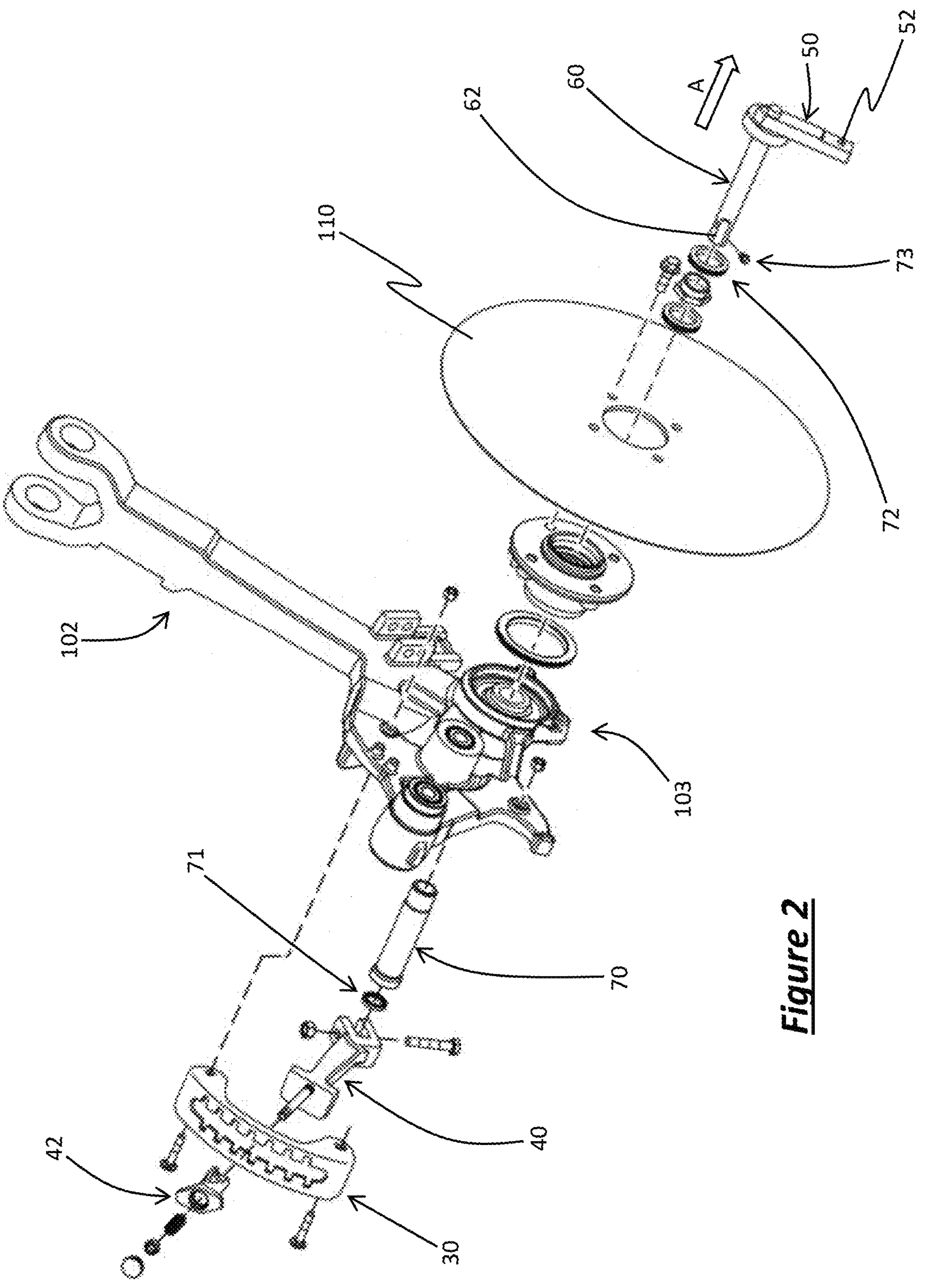
FIG. 2 is an exploded perspective view of a components forming a portion of the disk opener unit.

An exploded perspective view of a components forming a portion of the disk opener unit is shown in FIG. 2. The gauge wheel depth adjustment arm 50 is seen, with an end 52 that in use supports the gauge wheel 120, although the gauge wheel itself is not shown in this drawing. In a conventional form, as seen here, the depth adjustment arm 50 is permanently attached, by welding or otherwise through unitary construction, to the spindle 60. With the opener unit assembled, the spindle 60 extends axially through the opener disk 110, through a spindle sleeve 70. Seals 71, 72 at respective ends of the sleeve 70 provide a seal between the sleeve 70 and the shaft of the spindle 60, and a grease fitting 73 is provided for lubrication of the seals. The opener disk 110 is itself rotatably mounted on a frame 103 attached to the trailer arm 102. A distal end 62 of the spindle 60 extends beyond the end of the spindle sleeve 70 to engage with an angle adjustment handle arm 40. Arm 40, which includes a generally T-shaped spring-loaded handle 42, can be manipulated by the user to rotate the spindle 60 and thereby change the angle of the adjustment arm 50. The handle 42 is arranged to engage with slots formed in an adjustment gauge plate 30, whereby engagement of the handle in a selected one of the slots holds the adjustment arm in the user selected angular orientation. As such, rotation of the arm 40 between the discrete positions varies the position of the gauge wheel 120 and thus the penetration depth of the disk 110.

As noted above, a conventional depth adjustment arm 50 is permanently attached to the spindle 60. As a result, to during disassembly of the opener unit the spindle is withdrawn from the spindle sleeve 70 and through the frame 103 and opener disk 110 in the direction indicated by arrow 'A' seen in FIG. 2. Accordingly, the distal end 62 of the spindle has maximum outer dimensions that must be less than the outer diameter of the shaft of the spindle 60 to enable the distal end 62 to be withdrawn from the sleeve and associated seals. For engagement with the angle adjustment handle arm 40, the distal end 62 of the spindle in conventional form is simply a squared-off section of the spindle shaft, i.e. the round spindle shaft is ground or otherwise formed with four flat surfaces.

Figure 3:
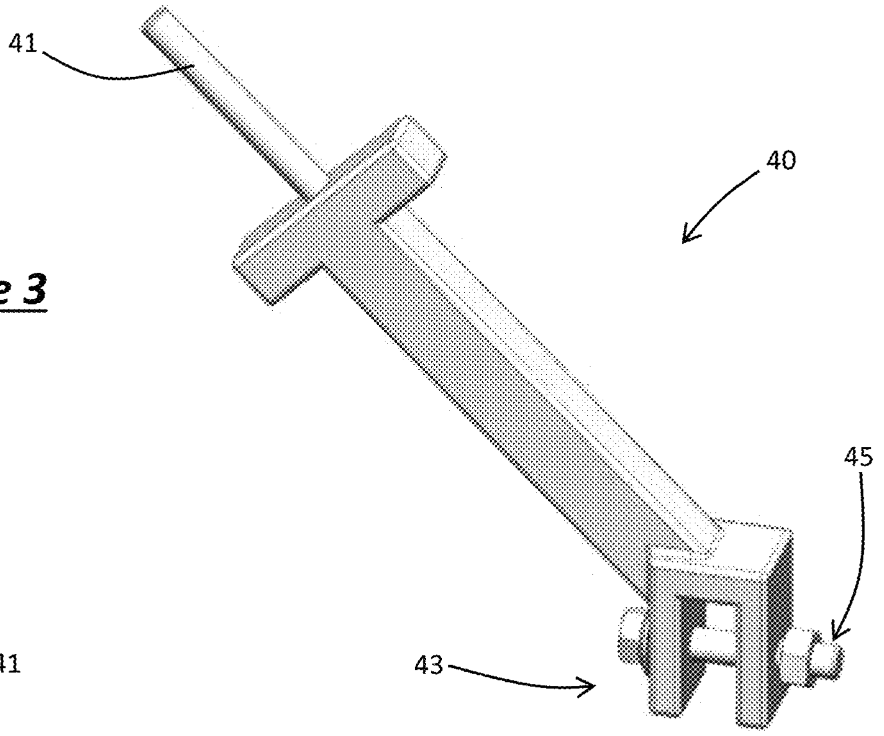
FIG. 3 shows an angle adjustment handle arm in isolation, seen in perspective view.
Figure 4:
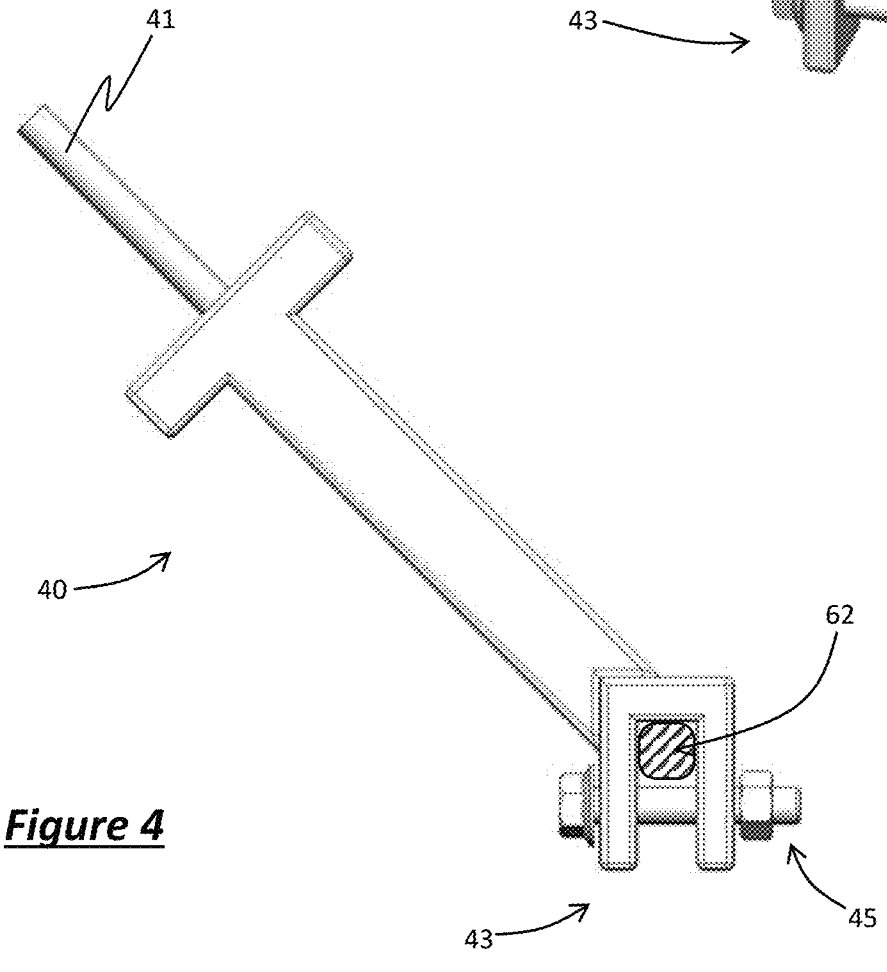
FIG. 4 is a front view of the angle adjustment handle illustrating engagement with a conventional gauge wheel depth adjustment spindle.

The angle adjustment handle arm 40 is shown in isolation in FIG. 3, seen in a perspective view. The end 41 of the arm 40 in use attaches to the handle 42, while the opposite end 43 has a bifurcated structure to receive the distal end 62 of the spindle 60. A lock bolt 45 extends through the arms of the bifurcated structure. FIG. 4 is a front view of the angle adjustment handle 40, illustrating engagement of the handle arm 40 with the distal end 62 of a conventional gauge wheel depth adjustment spindle. The squared-off distal end 62 of the spindle is designed to fit snugly into the space between the two sections of the bifurcated structure on the end 43 of the handle arm 40. The lock bolt 45 ensures that the spindle end 62 cannot slide out of the open end between the legs of the bifurcation.

During use the disk opener unit 100 is subject to considerable and prolonged jolting and vibration as it is towed across the agricultural fields. Accordingly, the gauge wheel 120 jolts and vibrates up and down, placing torque on the depth adjustment spindle 60 relative to the handle arm 40. Over time it has been found that this causes the squared-off end 62 of the spindle and/or the forks of the bifurcated structure 43 to wear, resulting in play between the handle arm 40 and the spindle 60. This means that the depth adjustment arm 50 is not maintained at an accurate angle orientation. Consequently, the gauge wheel assembly is unable to accurately regulate the depth of the opener disk 110 resulting in loss of target seeding depth. Not only does this reduce crop emergence as a result of shallow placed seeds or seeds on top of the ground, the constant movement of the spindle wears out the O-ring seals 71, 72. Once this O-ring seal deteriorates it lets dust into the assembly, causing it to seize up. The grease used for lubrication can actually make this problem worse, where dust mixes with the grease to cause "cake-lock failure" and the gauge wheel arm seizes solid, making even disassembly difficult. Moreover, the depth adjustment arm/spindle and the angle adjustment handle arm are prone to failure also.

Figure 5:
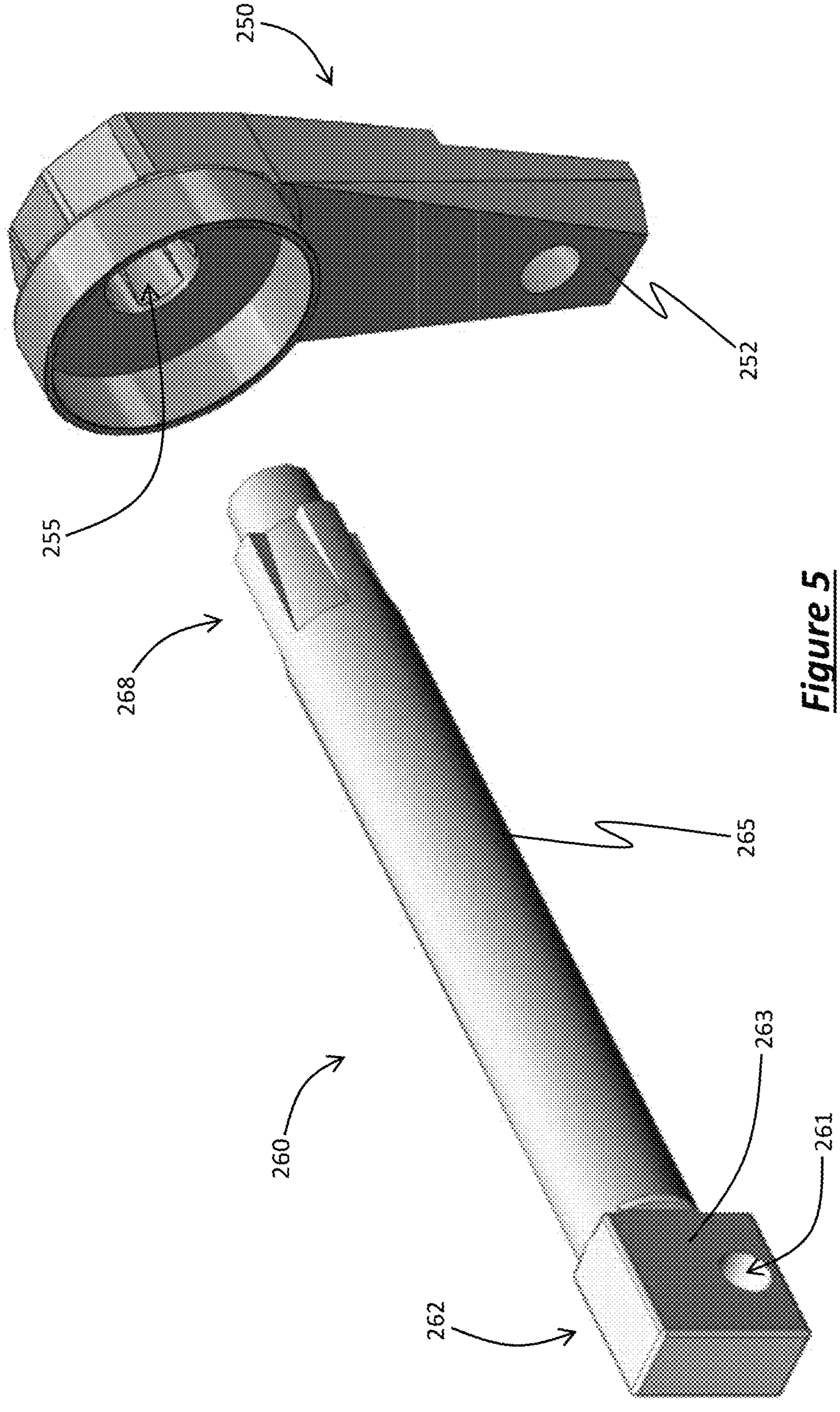
FIG. 5 shows spindle and gauge wheel arm components according to an embodiment of the present invention.

Embodiments of the present invention address the issues identified above with an improved depth adjustment arm assembly 200 described hereinbelow with reference to FIGS. 5 to 18. In particular, the depth adjustment arm assembly according to embodiments of the present invention includes separate spindle 260 and gauge wheel arm 250 as shown in FIG. 5. This allows for an improved structure 262 for engagement of the spindle with the angle adjustment handle arm 40, explained below with reference to FIGS. 5 to 8.

FIG. 5 shows the spindle 260 and gauge wheel arm 250 components separated from one another. In order to allow for secure coupling between the two, the spindle 260 and gauge wheel arm 250 have complementary engagement formations 268, 255 that will be described further below. Since the spindle 260 and gauge wheel arm 250 are separable, for disassembly the spindle may be withdrawn in the opposite manner as described above, and the engagement structure 262 need not fit through the spindle sleeve. Accordingly, the engagement structure 262 in this embodiment takes the form of a rectangular boss 263, enlarged in one dimension with respect to the diameter of the spindle shaft 265. The boss 263 has a through hole 261 extending through from one major face to the other.

Figure 6:
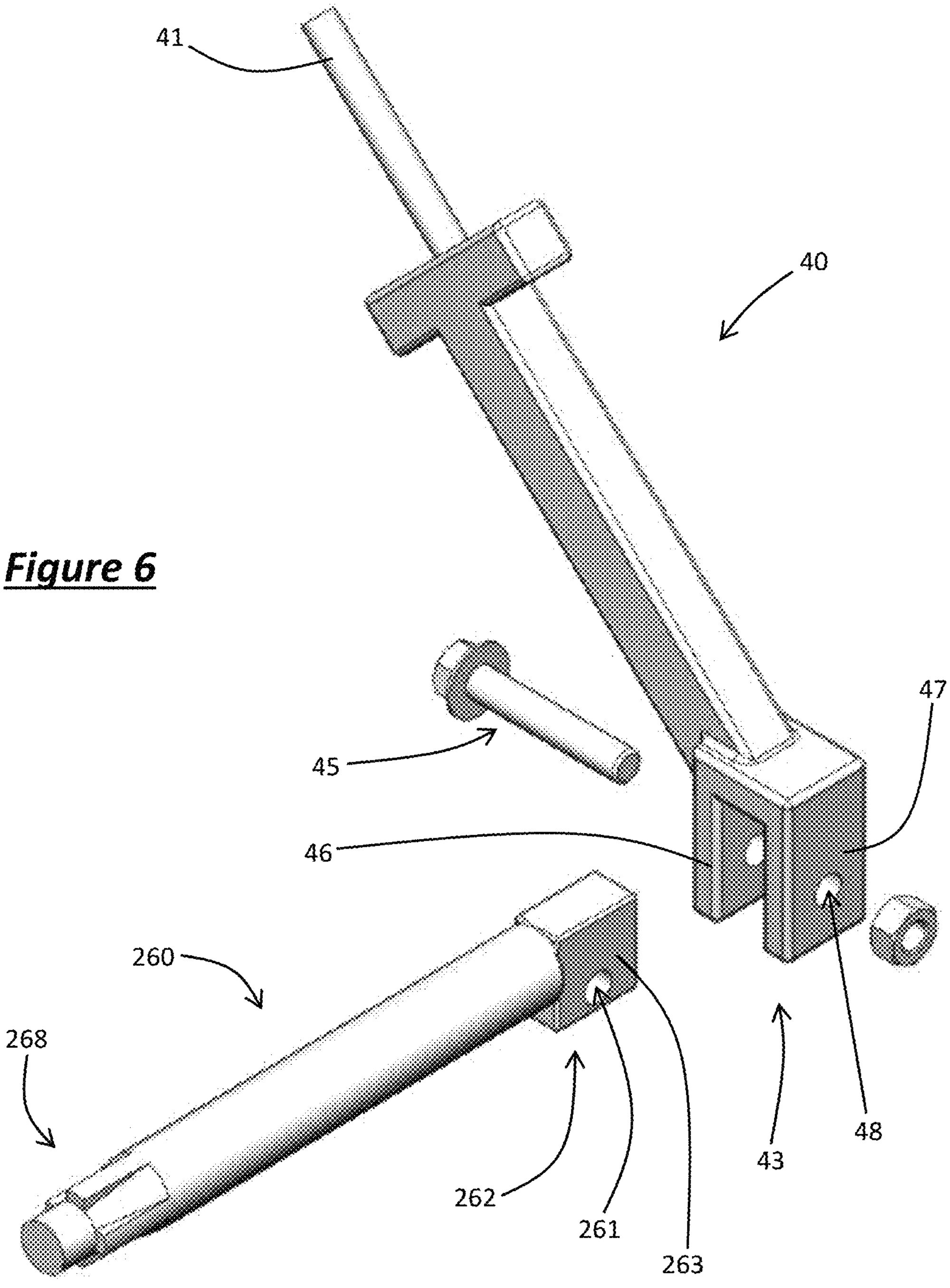
FIG. 6 is an exploded perspective view of the spindle of FIG. 5 in relation to an angle adjustment handle arm.

FIG. 6 is an exploded perspective view of the spindle 260 in relation to the handle arm 40, and FIG. 7 is a perspective view of the these components when assembled. The rectangular boss 263 is designed to have a greater surface area of engagement with the handle arm, as compared to the prior art, when seated in the space between the legs of the bifurcated structure 43, largely filling the space between the legs 46, 47. When seated, the through hole 261 aligns with the respective holes 48 in the legs 46, 47 such that the lock bolt 45 can extend therethrough. FIG. 8 is a front view of the angle adjustment handle 40, illustrating engagement of the handle arm 40 with the engagement structure 262. In comparison to the conventional form (e.g. as seen in FIG. 4) this arrangement, with enlarged contact area and with the lock bolt actually passing through the boss 263, provides a more secure engagement between the spindle 260 and handle arm 40, one that is less prone to wear and loosening through the rigours of use.

Figure 9:
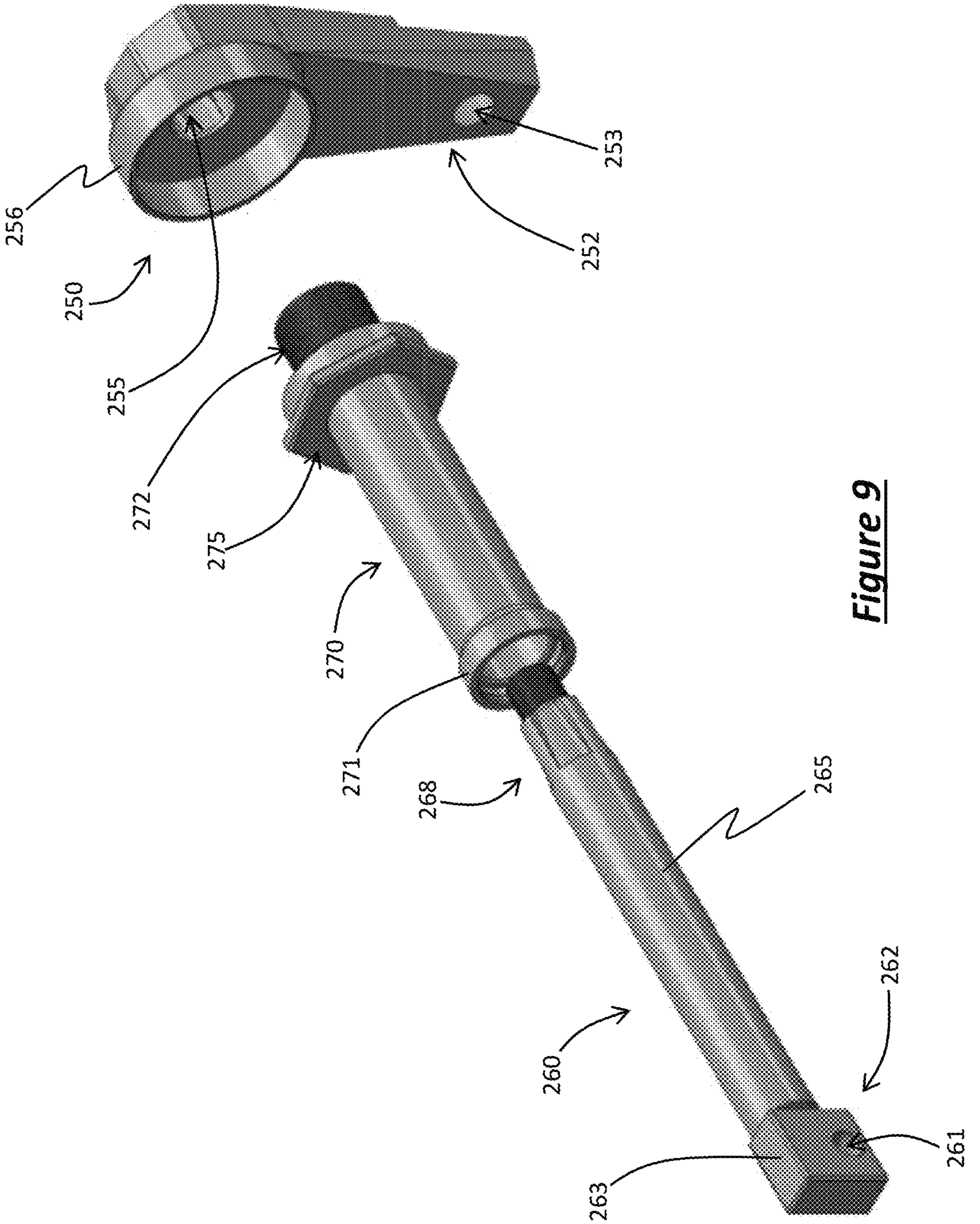
FIG. 9 is a perspective view showing a spindle, gauge wheel arm and spindle sleeve according to an embodiment of the invention.

The spindle 260 is shown in perspective view in FIG. 9 together with the gauge wheel arm 250 and spindle sleeve 270. When assembled, the spindle 260 extends through the sleeve 270, with the boss 263 projecting from a first end of the sleeve and the engagement formation 268 projecting from the second end of the sleeve. The engagement formation 268 mates with a complementary formation 255 provided in an aperture in the gauge wheel arm component 250. The sleeve first end has a flange 271 that accommodates a single-lip seal to form a seal between the sleeve and the spindle shaft 265. The sleeve second end has an exterior screw thread 272 upon which a spindle nut 275 can be mounted. An external triple lip seal is fitted onto the nut 275 to engage with the dust cap 256. The external triple-lip seal fits into a flange 256 provided on the gauge wheel arm 250. The gauge wheel depth adjustment arm 250 has an end 252 that in use supports the gauge wheel using a gauge wheel axle hole 253.

Figure 10:
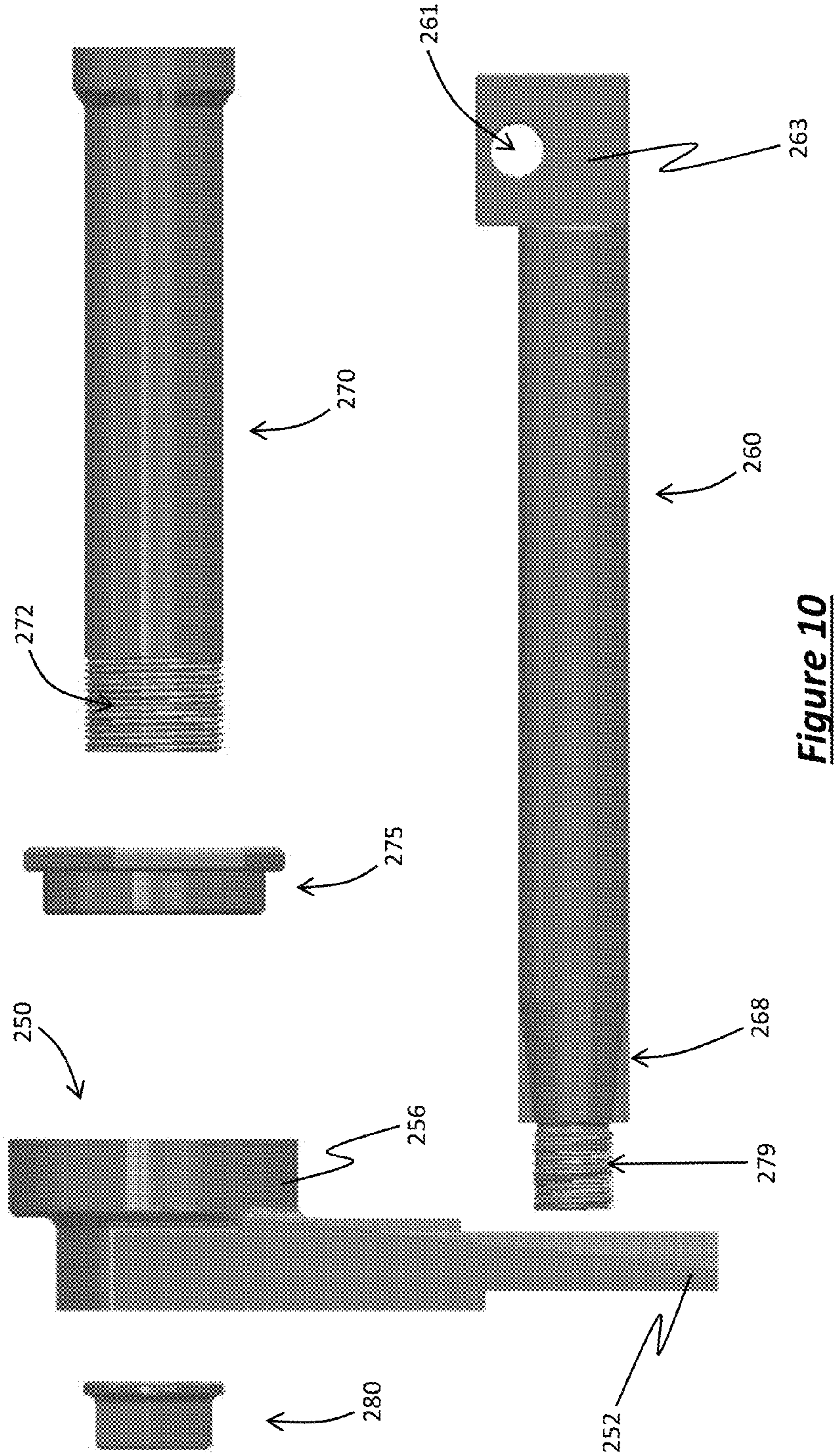
FIGS. 10 and 11 each show a layout of a collection of components comprising a depth adjustment arm assembly according to an embodiment of the invention.
Figure 11:
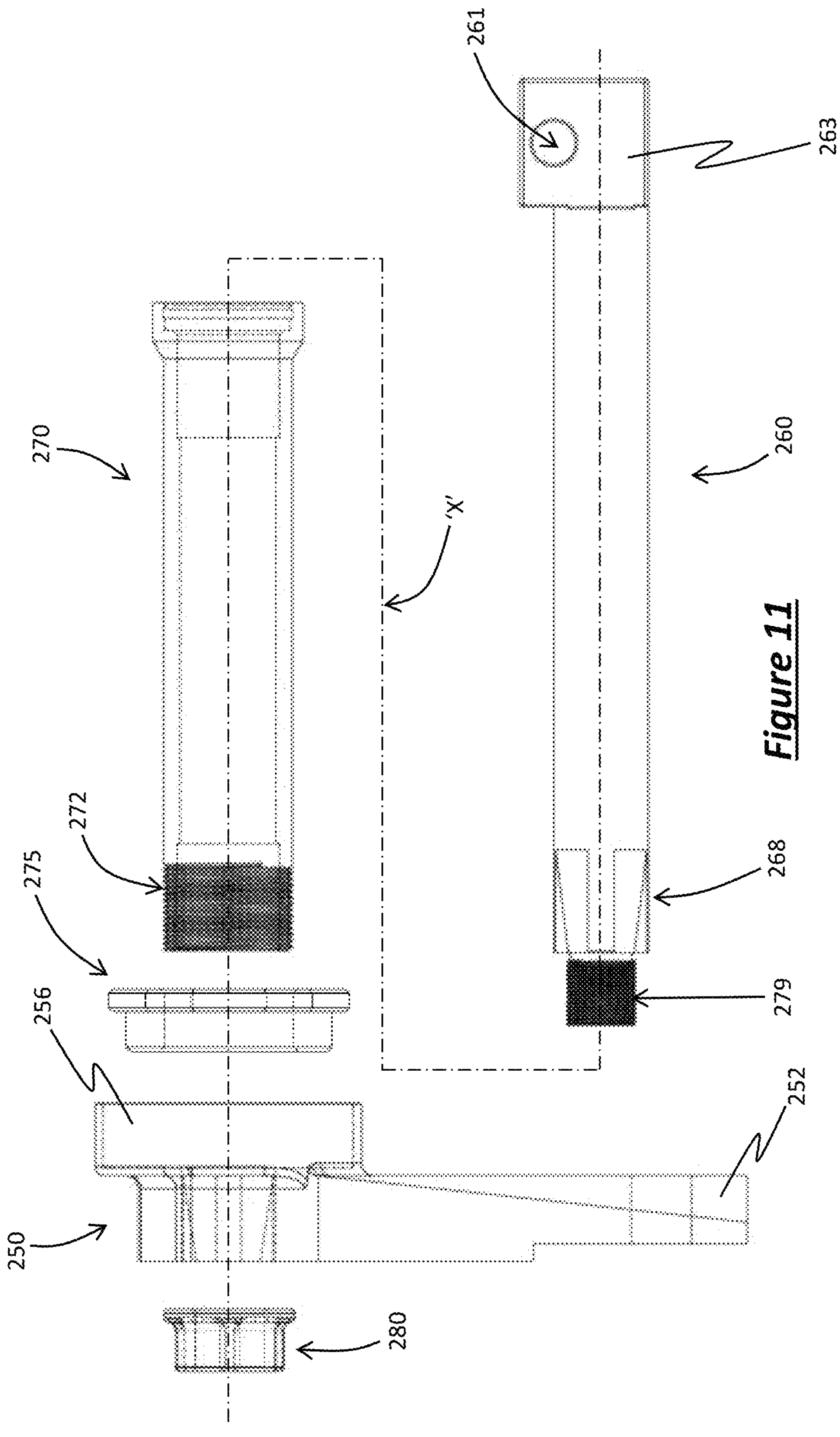
Figure 12:
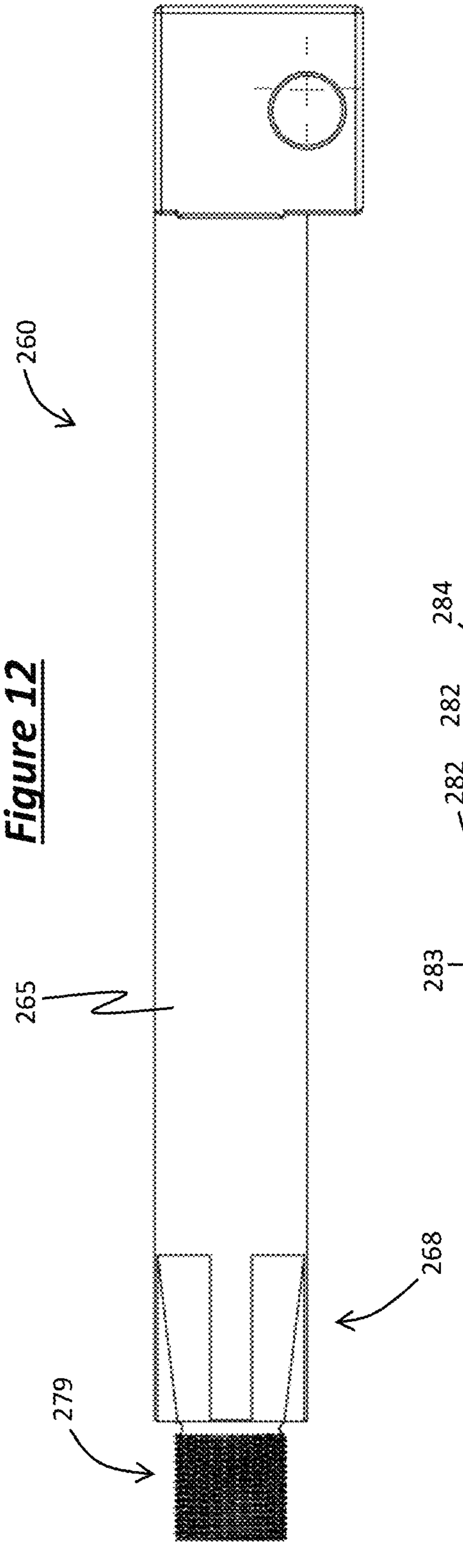
FIG. 12 is a side view of a gauge wheel depth adjustment spindle according to an embodiment of the invention.
Figure 13:
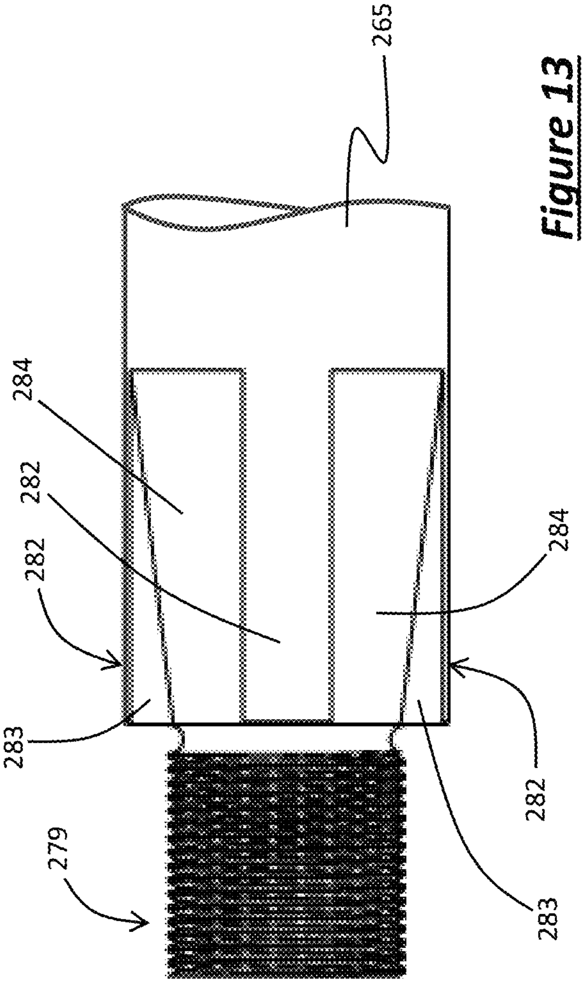
FIG. 13 is an enlarged view of the proximal end of the spindle as shown in FIG. 12.
Figure 14:
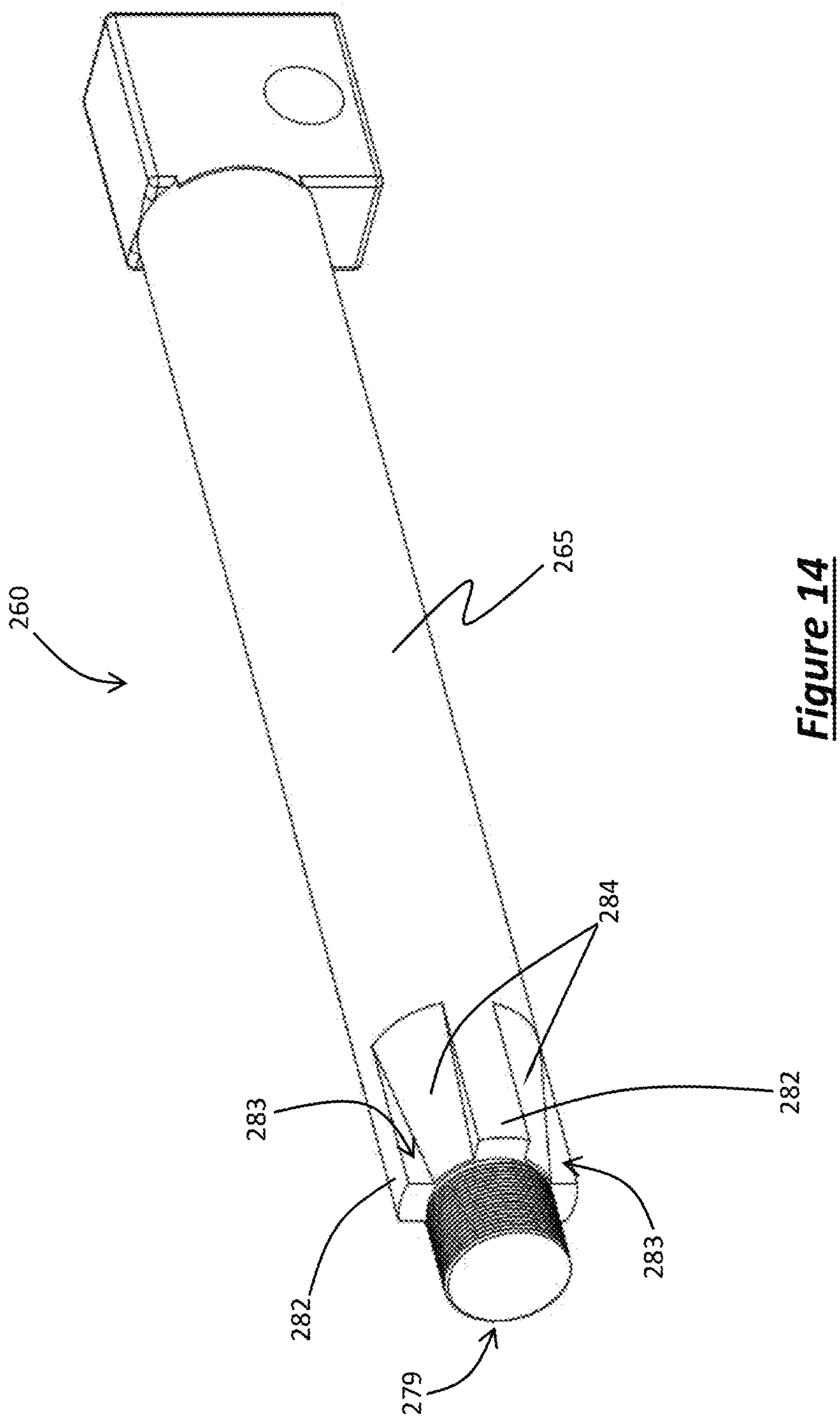
FIG. 14 is a perspective view of the spindle of FIG. 12.

FIGS. 10 and 11 each show a layout of the collection of components that comprise the depth adjustment arm assembly 200 according to an embodiment of the invention. The dashed line 'X' shown in FIG. 11 represents the centre or axis line of the assembly.

Since the spindle 260 and arm 250 are separable components in order to accommodate the enlarged boss 263, a secure manner of connecting them together is required bearing in mind the conditions they are likely to be subjected to. Accordingly, the spindle 260 and arm 250 according to embodiments of the present invention are provided with complementary structures forming a 'tapered spline' engagement. The proximal end of the spindle 260 has a section 279 of reduced diameter, as compared to the spindle shaft 265, which is externally threaded for receiving a corresponding internally threaded nut 280. The end of the spindle shaft adjacent the threaded section is machined with the tapered spine engagement formation 268, which has four teeth 282 equally spaced around the spindle shaft. The teeth 282 are in effect a continuation of the spindle shaft, defined by frustoconical tapering spline sections 284 therebetween. The spline sections 284 taper from the spindle shaft diameter to approximately the diameter of the threaded end section 279. The sides 283 of each tooth 282 are planar and extend parallel to the axis of the spindle shaft, although it is also possible for the teeth 282 to taper in width toward the proximal end of the spindle. The tapered spline engagement formation 268 of the spindle 260 is seen best in FIGS. 12-14.

Figure 15:
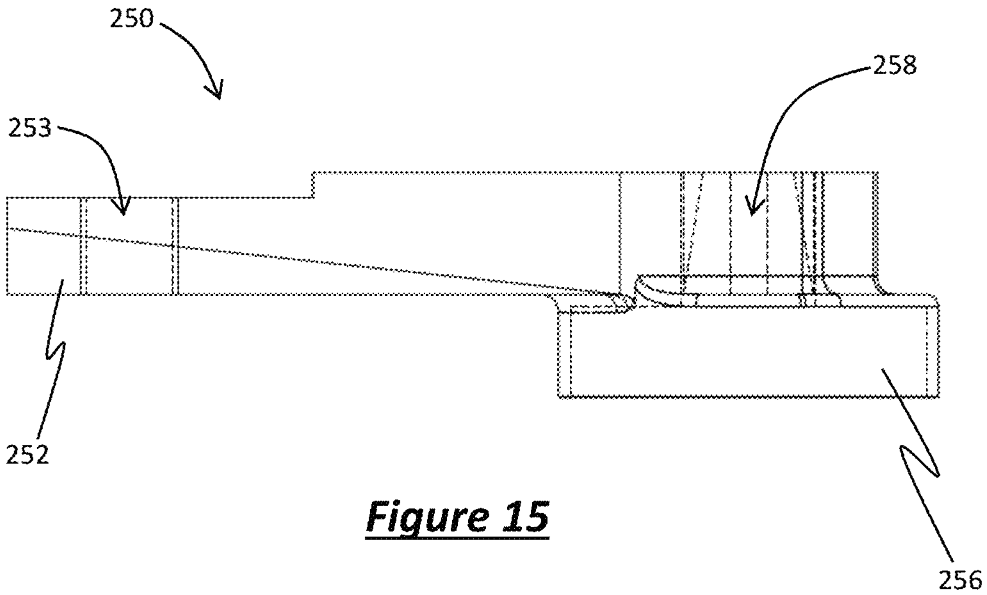
FIGS. 15 and 16 are side and front views, respectively, of a gauge wheel depth adjustment arm according to an embodiment of the invention, adapted for engagement with the spindle of FIG. 12.
Figure 16:
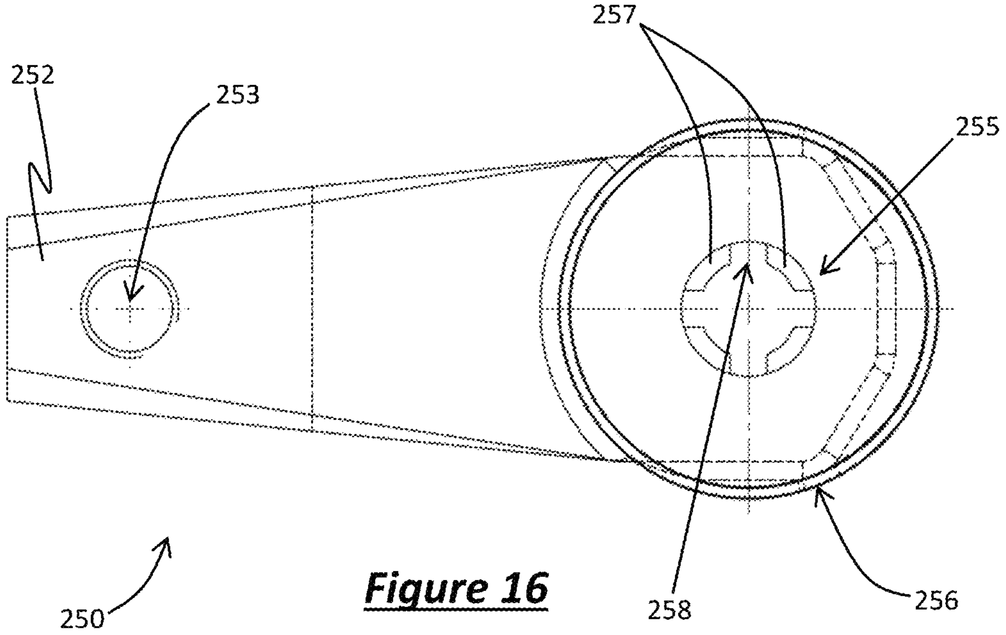
Figure 17A:
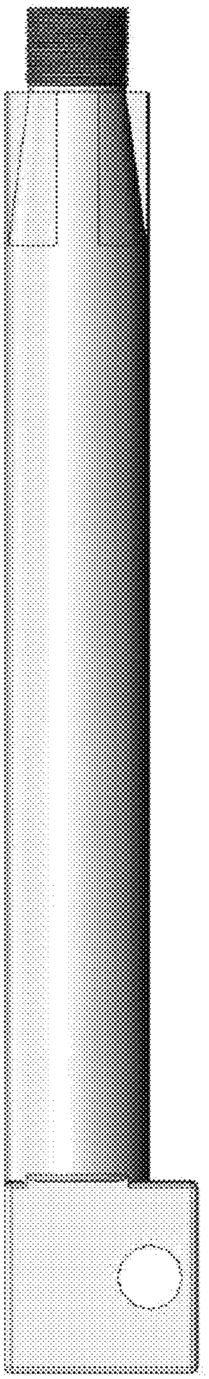
FIGS. 17A and 17B are side views of a gauge wheel depth adjustment spindle according to an embodiment of the invention.
Figure 17B:
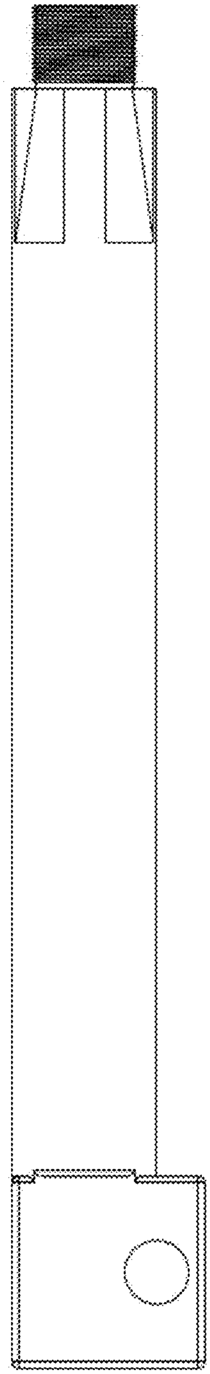
Figure 18A:
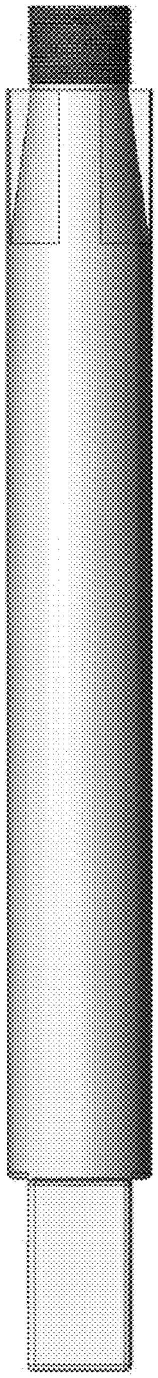
FIGS. 18A and 18B are top views of a gauge wheel depth adjustment spindle according to an embodiment of the invention.
Figure 18B:
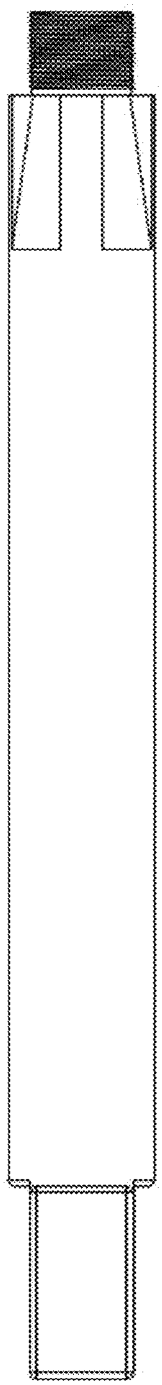
Figure 19A:
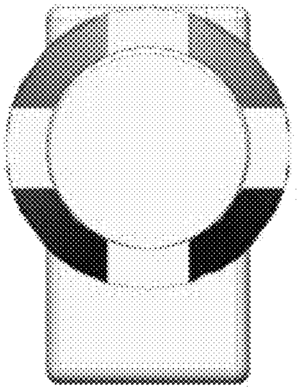
FIGS. 19A and 19B are proximal end views of a gauge wheel depth adjustment spindle according to an embodiment of the invention.
Figure 19B:
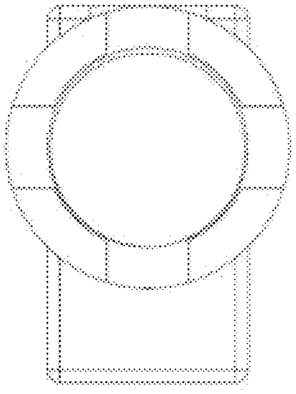
Figure 20A:
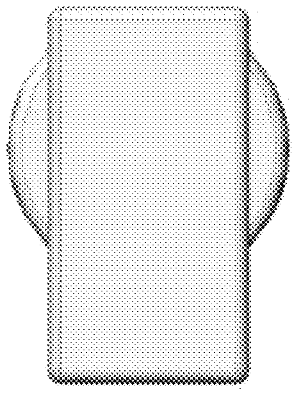
FIGS. 20A and 20B are distal end views of a gauge wheel depth adjustment spindle according to an embodiment of the invention.
Figure 20B:
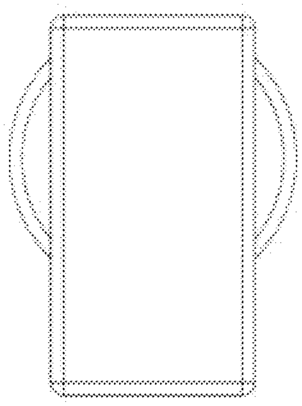
Figure 21A:
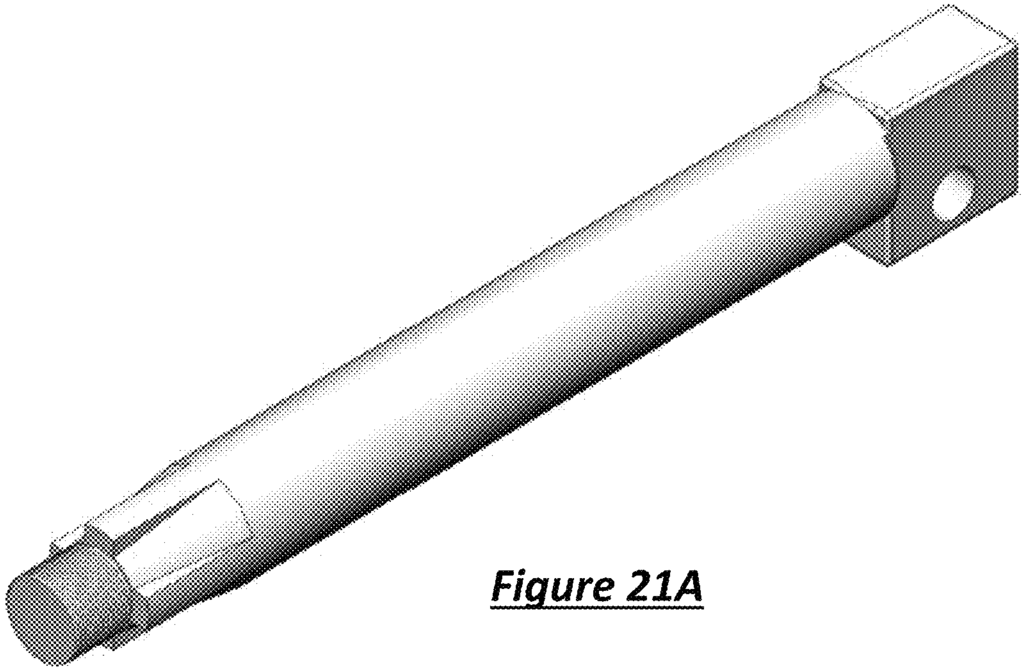
FIGS. 21A and 21B are perspective views of a gauge wheel depth adjustment spindle according to an embodiment of the invention.
Figure 21B:
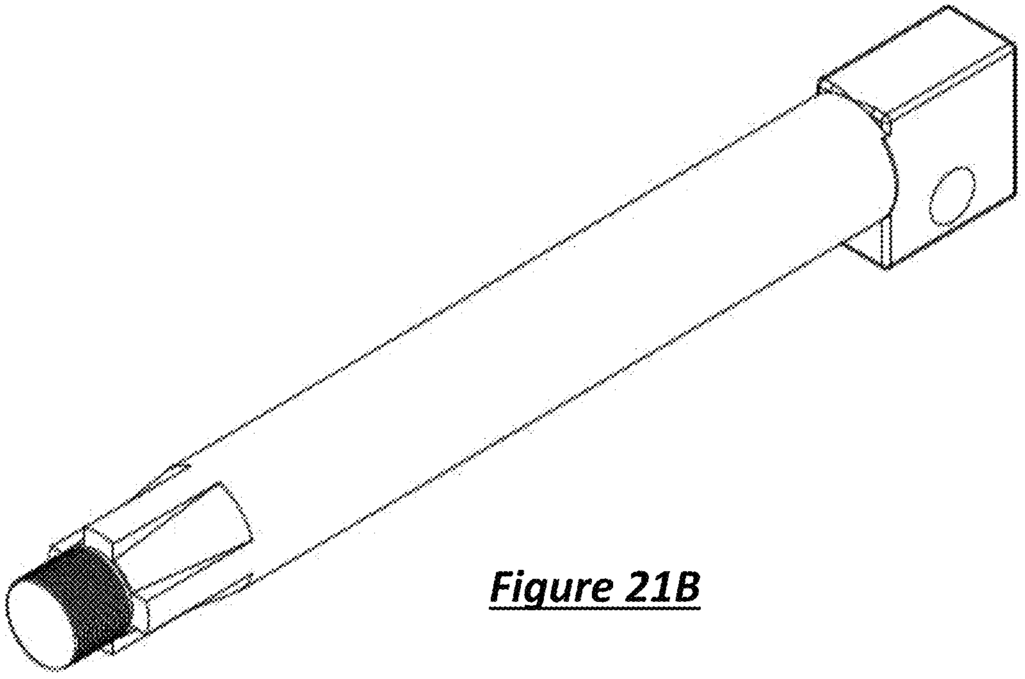

The gauge wheel arm 250 has a complementary tapered spline engagement formation 255 centrally located in the flange 256 (FIGS. 15 and 16). The formation 255 has four slots 258 that correspond with the teeth 282 on the spindle, between which are provided frustoconical tapered surfaces 257. By aligning the teeth 282 with the slots 258 the spindle engagement formation 268 may be inserted axially into the arm engagement formation 255. When so inserted, the threaded section 279 projects out of the opposite side of the arm component where it can be secured by use of the nut 280.

While embodiment described and illustrated herein employs four teeth and slots in the tapered spline engagement formations, it will be recognised that fewer or greater numbers of teeth and slots can alternatively be provided.

Assembly of the gauge wheel depth adjustment components according to embodiments of the invention may be performed as follows, bearing in mind that in practice the components are also assembled with parts of the overall disk opener unit at the same time. The spindle nut 275 is screwed onto the external thread 272 on the spindle sleeve 270, and the shaft 265 of the spindle 260 is inserted axially through the sleeve wherein the boss 263 projects from one end of the sleeve and the engagement formation extends from the other end. The single-lip seal on the boss end and the external triple-lip seal on the arm end seal around the spindle shaft and spindle nut such that periodic greasing is not required. With the teeth 282 aligned with the slots 258, the arm component 250 may be fitted onto the end of the spindle and secured in position using the nut 280. Tightening the nut 280 ensures a good engagement between the spindle 260 and arm 250 by way of the tapered spline engagement formations, wherein the teeth engage in the slots and the tapered frustoconical surfaces are pressed against one another.

The structure and implementation of embodiments of the invention has been described by way of non-limiting example only, and many additional modifications and variations may be apparent to those skilled in the relevant art without departing from the spirit and scope of the invention described.

Any discussion of documents, devices, acts or knowledge in this specification is included to explain the context of the invention. It should not be taken as an admission that any of the material forms part of the prior art base or common general knowledge in the relevant art in Australia or elsewhere on or before the priority date of the disclosure and claims herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A gauge wheel adjustment assembly for controlling penetration depth of a disk opener, comprising:

a spindle adapted to be rotatably supported in a spindle sleeve, the spindle having a shaft with a first end with a rectangular boss adapted for engagement with a depth adjustment handle of the disk opener and a second end with a tapered spline engagement formation; and a gauge wheel support arm having a complementary tapered spline formation for engagement with the second end of the spindle, wherein the rectangular boss has outside dimensions larger than an interior diameter of the spindle sleeve.

2. The gauge wheel adjustment assembly according to claim 1, wherein the tapered spline engagement formation of the second end of the spindle comprises a plurality of teeth distributed around a circumference of the spindle shaft with frustoconical tapered surfaces therebetween.

3. The gauge wheel adjustment assembly according to claim 2, wherein the tapered spline formation of the gauge wheel support arm comprises an aperture with a plurality of slots distributed around the circumference thereof with frustoconical tapered surfaces therebetween.

4. The gauge wheel adjustment assembly according to claim 1, wherein the spindle sleeve has first and second ends each provided with internal single lip and external triple-lip seals for sealing against respective external surfaces of the spindle shaft and support arm.

5. A gauge wheel adjustment assembly for controlling penetration depth of a disk opener, comprising:

a spindle adapted to be rotatably supported in a spindle sleeve, the spindle having a shaft with a first end with a rectangular boss adapted for engagement with a depth adjustment handle of the disk opener and a second end with a tapered spline engagement formation; and a gauge wheel support arm having a complementary tapered spline formation for engagement with the second end of the spindle, wherein the tapered spline engagement formation of the second end of the spindle comprises a plurality of teeth distributed around a circumference of the spindle shaft with frustoconical tapered surfaces therebetween.

6. The gauge wheel adjustment assembly according to claim 5, wherein the tapered spline formation of the gauge wheel support arm comprises an aperture with a plurality of slots distributed around the circumference thereof with frustoconical tapered surfaces therebetween.

7. A gauge wheel adjustment assembly for controlling penetration depth of a disk opener, comprising:

a spindle adapted to be rotatably supported in a spindle sleeve, the spindle having a shaft with a first end with a rectangular boss adapted for engagement with a depth adjustment handle of the disk opener and a second end with a tapered spline engagement formation; and a gauge wheel support arm having a complementary tapered spline formation for engagement with the second end of the spindle, wherein the spindle sleeve has first and second ends each provided with internal single lip and external triple-lip seals for sealing against respective external surfaces of the spindle shaft and support arm.

* * * * *